United States Patent [19]

Ando

[11] 4,042,161
[45] Aug. 16, 1977

[54] AUTOMATIC WELDING APPARATUS
[75] Inventor: Shimon Ando, Hitachi, Japan
[73] Assignee: Hitachi, Ltd., Japan
[21] Appl. No.: 672,079
[22] Filed: Mar. 30, 1976
[30] Foreign Application Priority Data
 Apr. 2, 1975 Japan .................................. 50-39153
[51] Int. Cl.$^2$ ........................................... B23K 37/02
[52] U.S. Cl. .................................. 228/102; 228/103
[58] Field of Search ........................ 228/7–10, 228/102, 103, 104; 219/124, 125 R

[56] References Cited
U.S. PATENT DOCUMENTS

| 2,971,079 | 2/1961 | Sommeria ........................ 219/125 R |
| 3,076,889 | 2/1963 | Enk ................................. 219/125 R |
| 3,408,475 | 10/1968 | Fier ................................. 219/125 R |
| 3,595,545 | 7/1971 | Sitnichenko et al. ......... 219/125 R X |

Primary Examiner—Al Lawrence Smith
Assistant Examiner—K. J. Ramsey
Attorney, Agent, or Firm—Craig & Antonelli

[57] ABSTRACT

An automatic welding apparatus having a robot and a welding torch, the robot including a main body serving as a drive means, an arm supported and driven by the main body to move in three-dimensional directions, and a wrist connected to a forward end of the arm for universal pivotal movement and supporting the welding torch. The wrist has mounted thereon two tactile sensors for sensing the positions of components to be joined by welding into a unitary structure, one of such sensors extending radially of the pivotal axis of the wrist and the other tactile sensor extending in the direction of the pivotal axis of the wrist. The positions of points at which welding should be performed are calculated based on the amount of displacement of each tactile sensor whereby the operation of the welding torch can be controlled.

8 Claims, 12 Drawing Figures

AUTOMATIC WELDING APPARATUS

BACKGROUND OF THE INVENTION

This invention relates to an automatic welding apparatus in which an industrial robot is used for performing welding.

Welding is one of the sections of industry in which the need for automation is most keenly felt to dispense with manual labor, because welding workers in their workshops must work under conditions which are harmful to health due to gases produced when welding is performed. Many attempts have, therefore, been made in recent years to introduce automatic operation into the field of welding by using an industrial robot.

Man is endowed with a highly developed brain and organs of senses, such as visual, tacticle and olefactory, and his body is soft and flexible. These qualities enable man to perform a highly complicated operation without any difficulty. When attempts are made to let a robot or other machine replace man in performing an operation automatically without manual attention, one invariably finds how difficult it is to let the machine perform an operation which is very simple for man to perform. This is particularly true with automation of a welding operation. A robot or other machine, although capable of faithfully performing an operation repeatedly with a high degree of precision so long as the operation is planned beforehand, lacks versatility because it is unable to make a decision by itself and alter the contents of the operation. This is one of the important problems encountered in automation of a welding operation.

More specifically, when alterations are made in the contents of an operation, new contents of the operation must be taught to the machine item by item. In a welding operation, components to be welded into a unitary structure are usually low in dimensional and configurational accuracy and this results in the contents of the operation differing from one set of components to another. This had made it necessary for the operator to teach the machine new contents of the operation for each set of components to be joined by welding. This is time consuming and requires a lot of labor in teaching the new contents to the machine. Thus, although the use of a robot or other machine in performing a welding operation has the effect of preventing workers from working under unhealthy conditions, it does not meet the requirement of economizing on labor. It will be appreciated that the most important problem encountered in automating a welding operation is how to enable a welding operation to be performed without requiring to teach the machine new contents of the operation each time alterations are made in the operation.

In order to solve this problem, efforts have been made to increase the dimensional and configurational precision of the components to be welded into a unitary structure to make up for the lack of ability of a robot, so that the need to teach the contents of the operation to the robot for each set of components to be welded can be eliminated. This requires cutting of steel plates accurately in accordance with the design drawing. Steel plates must be cut by a new process as by using a plasma, not a gas, so that the dimensions of the components when temporarily assembled are correct with a tolerance of ± 1 mm. When a gas is relied on for performing cutting of steel plates, it will be necessary to use an NC machine tool.

It will also be necessary to perform temporary assembling of components, which has hitherto been performed by means of simple gages and jigs, by using mechanized equipment in order to increase the precision with which assembling is accomplished.

A great deal of efforts are required in accurately positioning the temporarily assembled components on the positioner in the next following step of operation. Even if a lot of time and labor are devoted to the operation of positioning the temporarily assembled components prior to welding them into a unitary structure, the occurrence of welding deformation is unavoidable during the welding operation. Thus, the weld made may be deflected considerably from the predetermined position due to welding deformation as the welding operation draws to a close. In the prior art method, it is impossible to absorb the deflection of the weld due to welding deformation. If the components are welded in a position other than the position planned for welding, the strength of the welded structure will be greatly lowered or a lot of time and labor will be required for performing repair. Also, many accidents, such as collision of the welding torch against the components to be welded, will cause damage to the welding machine or the robot, and a short circuit accident will also occur.

As aforesaid, automatic welding apparatus of the prior art, although enabling manual attention to be eliminated in acutally performing welding because of the fact that welding itself is performed by a robot, has the disadvantages of having to perform time-consuming preparatory operations by a large number of operators prior to a welding operation or of requiring additional equipment. Thus, full realization of advantages from use of a robot in performing an automatic welding operation has been hampered by inability to overcome these obstacles.

SUMMARY OF THE INVENTION

An object of this invention is to provide an automatic welding apparatus which enables a welding operation to be automatically performed by readily detecting the interface formed by the adjacent surfaces of two components to be joined by welding or the line of weld to be made.

Another object is to provide an automatic welding apparatus which eliminates the need to perform time-consuming preparatory operations by a large number of operators prior to performing a welding operation.

Still another object is to provide an automatic welding apparatus which enables relative positions of the welding torch and the components to be welded to be determined only by performing simple calculations.

A further object is to provide an automatic welding apparatus which enables the posture of a work consisting of components to be welded to be changed into a posture in which welding can be performed with ease, when the position and posture of the work has been detected.

Welding is performed by applying a voltage across the components or steel plates to be joined and the electrode in the welding machine to produce an arc which melts the core wire by its heat. The molten metal is deposited on the welding zone while the steel plates are melted and welded. Since the molten metal drops onto the welding zone, welding is preferably performed by a downhand welding technique, and this technique ensures the production of defectfree welds.

In recent years, the advent of micro-computers and other very small computers has made it possible to effect control of a robot by means of a computer. In the present invention, the aforementioned objects are accomplished by improving the performance of the robot by utilizing a computer while close cooperation is maintained between the robot and the positioner for the workpiece which is used for aiding in performing a welding operation.

More specifically, according to this invention, the welding torch is moved along the detected interface formed by the adjacent surfaces of the components to be joined by welding. When difficulty is experienced in moving the welding torch along the interface where a weld is to be produced, the positioner is first actuated to bring the work, which consists of assembled components, to a predetermined posture and then the welding torch is moved along the interface formed by the adjacent components of the work to made a weld therein.

In one aspect of the present invention, there is provided an automatic welding apparatus comprising a robot and a welding torch having a tip, wherein said robot comprises a main body serving as a drive means, an arm supported by the main body and driven thereby to move in three-dimensional directions, a wrist connected to a forward end of the arm for universal pivotal movement and supporting said welding torch, a plurality of tactile sensors mounted on said wrist for tactually sensing positions of components to be welded, one of said tactile sensors extending radially of the pivotal axis of the wrist and the other tactile sensor extending in the direction of the pivotal axis of the wrist, and means for calculating the positions of points at which welding is to be performed based on the amount of displacement of each tactile sensor and producing control signals whereby the tip of said welding torch can be positioned in each of said points in response to each of said control signals.

In another aspect of the invention, there is provided an automatic welding apparatus comprising a robot and a welding torch having a tip, wherein said robot comprises a main body serving as a drive means, an arm supported by the main body and driven thereby to move in three-dimensional directions, a wrist connected to a forward end of the arm and supporting the welding torch, at least one tactile sensor mounted on the wrist and extending radially of the pivotal axis thereof for tactually sensing the position of one of components to be joined by welding, and means for calculating a displacement of a line of weld to be made so as to determine the position of the line of weld to be made in which the displacement in the direction of pivotal axis of the wrist is zero, based on the amount of displacement of the tactile sensor and a predetermined amount in the direction of the pivotal axis of the wrist, said calculating means producing control signals whereby the tip of the welding torch can be positioned in a point to be welded in response to each of said control signals.

It is to be understood that the invention is not limited to the type of tactile sensors shown and described herein and that sensors of non-contact type may be used. For example, sensors which rely on changes in magnetic force may be used to calculate the distance between their contacts and the components to be welded.

DESCRIPTION OF THE PREFERRED EMBODIMENT

A preferred embodiment of the invention will now be described with reference to the accompanying drawings.

Figure 1:
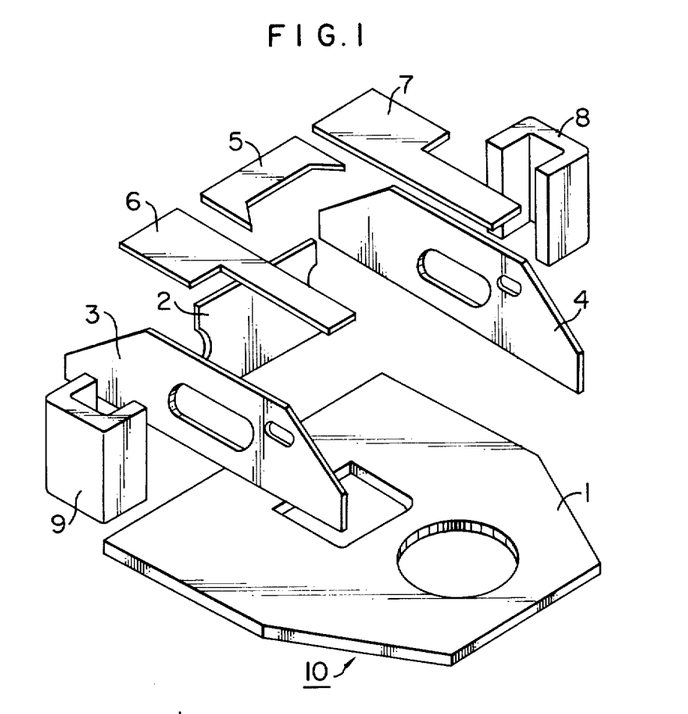
FIG. 1 is an exploded view of a structure to be formed by welding, showing the different shapes of its components or steel plates.
Figure 2:
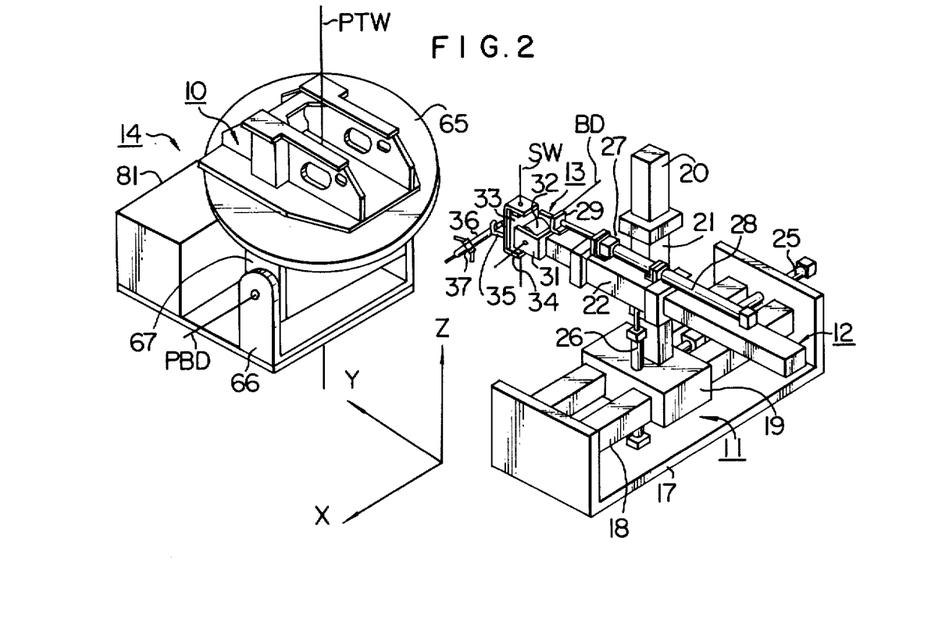
FIG. 2 is a view showing the arrangement and details of various elements of the automatic welding apparatus comprising one embodiment of this invention.
Figure 3:
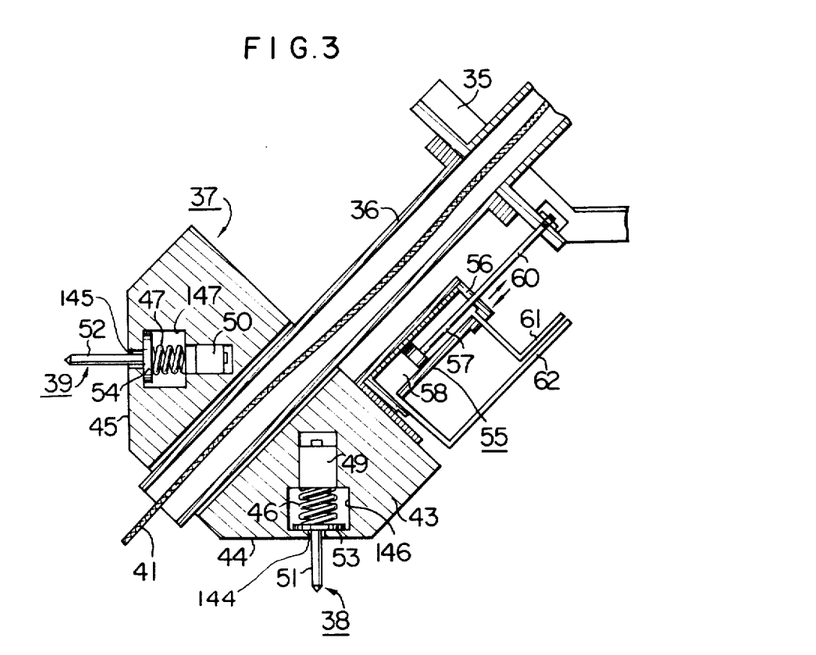
FIG. 3 is a fragmentary detailed view of the automatic welding apparatus shown in FIG. 2.

FIG. 1 shows, as one example, components of a structure to be formed by welding which is a center frame of a construction machine, and FIG. 2 and FIG. 3 show the automtic welding apparatus comprising one embodiment of the invention.

The structure or work 10 shown in FIG. 1 consists of various kinds of steel plates 1 to 7 and shape steels 8 and 9. The components 1 to 9 are joined by welding by means of an automatic welding machine to form the structure 10. In FIG. 2, the automatic welding machine comprises a robot including a main body 11 serving as a drive means, an arm 12 and a wrist 13, and a positioner 14 on which the work 10 is placed. The main body 11 of the robot comprises a frame 17, rails 18 arranged horizontally in the frame 17, a saddle-type bearing box 19 housing a bearing (not shown) therein and mounted on the rails 18, a vertical post 20 secured to the bearing box 19, a cross bearing box 21 housing a bearing (not shown) therein and mounted on the post 20, and a cross bearing box 22 housing a bearing (not shown) and secured to the cross bearing box 21.

The bearing box 19 is connected to an X-axis direction hydraulic cylinder 25 attached to the frame 17.

Upon actuation of the cylinder 25, the bearing box 19 and a device supported thereby move in an X-axis direction. The bearing box 19 has a Z-axis direction hydraulic cylinder 26 mounted between the bearing boxes 19 and 22. Upon actuation of the cylinder 26, the bearing boxes 21 and 22 and devices supported thereby move in a Z-axis direction. The bearing box 22 has a Y-axis direction hydraulic cylinder 28 attached thereto through a fixture 27 and receiving therein a piston connected to a piston rod which is secured at its forward end 29 to the arm 12 through a bracket. Upon actuation of the cylinder 28, the arm 12 and wrist 13 and parts mounted thereon move in a Y-axis direction. From the foregoing, it will be appreciated that the arm 12 and wrist 13 and the parts mounted thereon can be moved in the Z-axis, Y-axis and Z-axis directions.

The wrist 13 connected to the forward end of the arm 12 comprises a U-shaped flange 31, a hydraulic swinging motor 32 mounted in the flange 31 for angular rotation, another hydraulic swinging motor 33 forming a unit with the motor 32, and a U-shaped flange 34 supporting the motor 33. The fist hydraulic swinging motor 32 is angularly rotatable about a BD-axis which is parallel to the X-axis, while the second hydraulic swinging motor 33 is angularly rotatable about an SW-axis which is at right angles to the BD-axis. Thus, by operating the two hydraulic swinging motors 32 and 33, it is possible to bend the wrist 13 in various directions.

The flange 34 has attached thereto a projection flange 35 which has a welding torch 36 and sensor means 37 secured thereto. The welding torch 36 and sensor means 37 will be described in detail with reference to FIG. 3. The flange 35 has detachably secured thereto the welding torch 36 in which a core wire 41 extends. The cylindrical torch 36 is filled with a $CO_2$ gas flowing around the core wire 41, so that a voltage can be impressed across the work and the core wire 41. The details of the welding means are known and do not form a part of the invention, so that the description thereof will be omitted.

The sensor means 37 is slidably mounted on the welding torch 36 and comprises a main body 43, a Z-direction tactile sensor 38 and a Y-direction tactile sensor 39. The main body 43 has two surfaces 44 and 45 which can be disposed parallel to the Y-axis and Z-axis respectively. The main body 43 is formed therein with stepped bores 146 and 147 whose longitudinal axes are in line with the Z-axis and Y-axis respectively and which have openings 144 and 145 in the surfaces 44 and 45 respectively. Mounted in minor diameter portions of the stepped bores 146 and 147 are displacement detectors 49 and 50 respectively which are capable of detecting displacements of sensor rods 51 and 52 respectively.

The sensor rods 51 and 52 which are received in the bores 146 and 147 respectively each have a forward end portion which projects outwardly through one of the openings 144 and 145. The sensor rods 51 and 52 have disks 53 and 54 respectively attached to their intermediate portions, and coil springs 46 and 47 are mounted between the disks 46 and 47 and the shoulders formed in the stepped bores 146 and 147 respectively as shown in FIG. 3, so that the sensor rods 51 and 52 are normally urged to move outwardly through the openings 144 and 145 by the biasing forces of the springs 46 and 47 respectively. Thus, when the sensor rods 51 and 52 are brought into contact with the components of the work 5, the position of the latter can be detected.

A pneumatic pressure mechanism 55 is mounted between the main body 43 of the sensor means 37 and the flange 35 and comprises a pneumatic pressure cylinder 56 and a piston rod 60 connected at one end to a piston inserted in the cylinder and 56 and at the other end to the flange 35. If air is introduced into an air chamber 57 in the cylinder 56 through an air line 61, then the cylinder 56 moves upwardly along the piston rod 60, thereby moving the sensor means 37 upwardly. If air is introduced into an air chamber 58 in the cylinder 56 through an air line 62, then the cylinder 56 moves downwardly along the piston rod 60, thereby moving the sensor means 37 downwardly. It is for the purpose of ensuring ease and safety in performing a welding operation that the sensor means 37 are moved back and forth relative to the welding torch 36. The sensor means 37 is moved forwardly when the posture of the work 10 is detected and moved rearwardly when welding is carried out.

Figure 4:
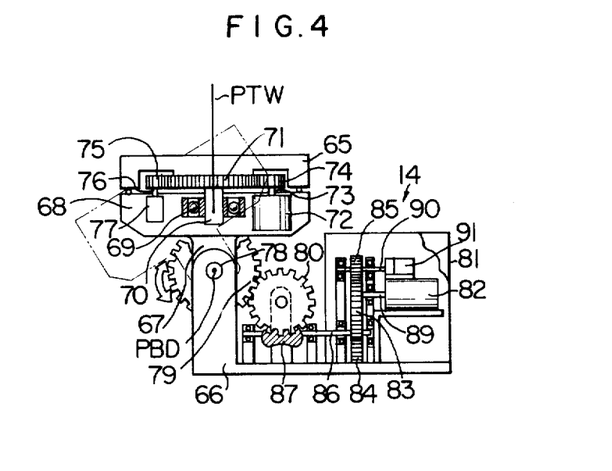
FIG. 4 is a sectional view of the positioner in explanation of its construction.

Referring to FIG. 2 again, the positioner 14 includes a stool 65 which is pivotal and rotatably supported so as to enable the posture of the work 10 to be changed to permit welding to be performed by a down-hand welding technique. The positioner 14 will be described in detail with reference to FIG. 4 wherein the stool 65 having a vertical PTW-axis is provided with a rod 70 which projects downwardly from the center of the underside of the stool 65 along the PTW-axis and which is rotatably supported by a bearing 69 mounted in the central portion of a disk 68. The rod 70 has secured thereto a gear 71 which is maintained in meshing engagement with a gear 74 affixed to an output shaft 73 of a drive motor 72 mounted within the disk 68. Thus, rotation of the drive motor 72 is transmitted, through the gears 74 and 71 meshing with each other, to the stool 65 to rotate the same about the PTW-axis. Maintained also in meshing engagement with gear 71 is another gear 75 supported by a shaft which is connected to a position detector 77 mounted within the disk 68. As can be seen in FIG. 4, the stool 65 rests on the disk 68 and supported thereby through a ball bearing mounted between the underside of a downwardly projecting flange of the stool 65 and the upper surface of an outer marginal portion of the disk 68.

The disk 68 has secured to its underside a bearing box 67 housing therein a bearing (not shown) which supports a rod 78 having a PBD-axis which extends normal to the PTW-axis. The rod 78 is secured at opposite ends thereof to a frame 66 so that the bearing box 67 is supported by the rod 78 for pivotal movement about the PBD-axis.

By this arrangement, the positioner 14 is capable of moving in pivotal movement about the PBD-axis of the rod 78 supported by the frame 66 to move between solid line and dash-and-dot line positions as shown. Upon actuation of the drive motor 72, the positioner 14 rotates about the PTW-axis. The positioner 14 is moved in pivotal movement about the PBD-axis by rotating a crescent gear 79, which is mounted to act as a unit with the gear box 67, by a gear 80 which is in meshing engagement with the crescent gear 79. Mounted within the frame 66 is a gear box 81 in which are mounted a drive motor 82 and a gear train 83, 84 and 85. The drive motor 82 has an output shaft 89 which rotates gear 83 maintained in meshing engagement with gears 84 and 85. The gears and output shaft are supported by various kinds of bearings.

The gear 84 has an output shaft 86 which mounts thereon a worm gear 87 which is maintained in meshing engagement with the gear 80 maintained in meshing engagement with the crescent gear 79, as aforementioned. The gear 85 has an output shaft 90 which is connected to a position detector 91. Thus, rotation of the drive motor 82 is transmitted through the gear train to the crescent gear 79 and the degree of rotation thereof is detected by the position detector 91.

Figure 5:
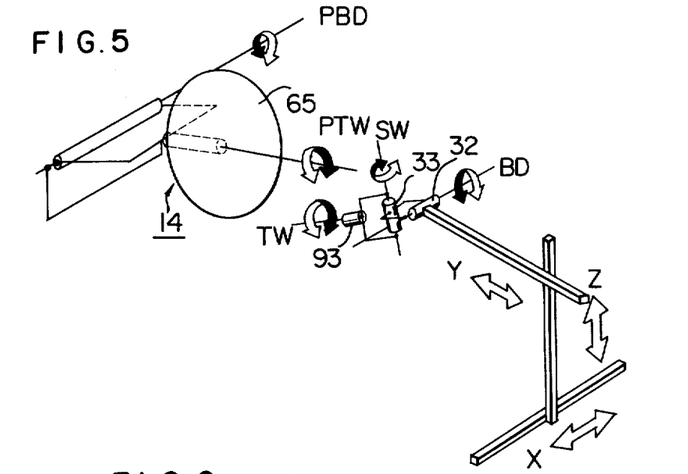
FIG. 5 is a view in explanation of the system of coordinates for various drive sections of the automatic welding apparatus.

The arrangement of the parts shown in detail in FIG. 2 is shown in a simplified form in FIG. 5. In FIG. 5, the wrist 13 is shown as having another swing motor 93 in addition to the swing motors 32 and 33 described above. Thus, swing motor 32 is angularly rotatable about the BD-axis which is parallel to the X-axis, swing motor 33 is angularly rotatable about the SW-axis which is normal to the BD-axis, and swing motor 93 is angularly rotatable about a TW-axis which is normal to the SW-axis. The system of coordinates of the welding apparatus as a whole is as shown in FIG. 5.

Figure 6:
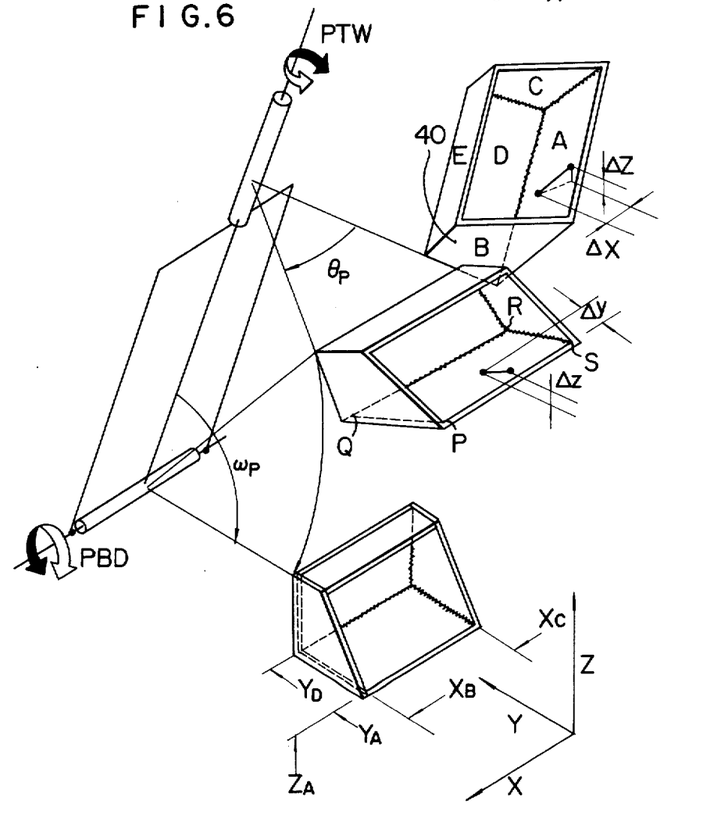
FIG. 6 is a view in explanation of the angles of inclination of a box-shaped structure with respects to the planes of the robot and a method for removing the angles of inclination of the structure.

Since the positioner 14 can be rotated angularly about the two axes or the PBD-axis and PTW-axis, it is possible to cause the stool 65 to face any direction as desired and to cause the plane in which the surface of the stool 65 is disposed to form any angle with a given plane. For example, let us assume that a box made of steel plates A, B, C, D and E assembled as shown in FIG. 6 is mounted on the stool 65 which is disposed in a certain posture. If it is desired to bring the steel plate A, which forms the basis of the box, to a position in which it is parallel with the X-Y plane of the system of coordinates of the robot, one has only to first rotate the box about the PTW-axis of the positioner 14 through an angle $\theta p$ and then about the PBD-axis through an angle $\omega p$. The degree of inclination of the steel plate A in the X-axis direction with respect to the X-Y plane can be determined as follows before effecting correction of the posture of the box. That is, coordinates at any two points along the A-axis in the steel plate A or $(x_1, y_1, z_1)$ and $(x_2, y_2, z_2)$ are measured and the differences between them or $\Delta x_1, \Delta z_1$ are obtained. The value of $\theta p$ can be obtained readily by using $\Delta x_1, \Delta z_1$ from the following equation:

$$\theta p = \tan^{-1} \frac{\Delta z_1}{\Delta x_1} \quad (1)$$

Also, the degree of inclination $\omega p$ with respect to the Y-axis can be obtained from the following equation by using $\Delta z_2, \Delta y_2$ obtained from the coordinates of two points along the Y-axis:

$$\omega p = \tan^{-1} \frac{\Delta z_2}{\Delta y_2} \quad (2)$$

It is readily possible to cause the robot to measure the coordinates of two points along the X-axis in the steel plate A, so that the differences of the coordinates can be obtained and the values of $\theta p$ and $\omega p$ can be calculated from these values by the computer used for controlling the robot. By using the obtained values as the basis for instructions, the positioner 14 can be angularly rotated about the PTW-axis and PBD-axis, so that the steel plate A (or any plane as desired of a structure to be formed by welding its components) can be readily brought to a position in which it is parallel with the X-Y plane of the robot. To bring the steel plate B to a position in which it is parallel with the Y-Z plane of the robot, one has only to obtain an angle formed by the steel plate B and the Y-axis in the same manner as aforementioned and rotate the positioner 14 about the PTW-axis through the obtained angle.

By bringing the steel plate A into a position in which it is parallel with the X-Y plane, it is possible to detect the interfaces formed by the adjacent components of the structure along which welding is to be applied or lines of welds to be made PQRS without directly tracing them. In case the structure to be formed by welding its components is rectangular in form as shown in FIG. 6, lines of welds to be made can be obtained if the coordinate $Y_A$ on the Y-axis of the front edge of the steel plate A and the coordinate $X_B$ of a side steel plate B, the coordinate $X_C$ on the X-axis of a side steel plate C and the coordinate $Y_D$ of a side steel plate D, and the coordinate $Z_A$ on the Z-axis of the steel plate A are known. To determine the coordinate $X_B$, one has only to cause the robot to project its sensor means 37 toward the steel plate B and read out the coordinate on the X-axis when the sensor means has detected the steel plate B. If the posture of the work 10 is corrected such as to bring the positions of its components into agreement with the system of coordinates of the robot, the lines of welds to be made PQRS can be readily determined by obtaining the five coordinate points $Y_A, Y_D, X_C, X_B$ and $Z_A$.

It will be appreciated that by adopting the aforementioned procedure, it is possible to eliminate complicated preparatory operations which have hitherto been necessary in the prior art in carrying out welding and it is also possible to eliminate the need to feed to the robot detailed information on the lines of welds to be made. The robot itself will detect the interfaces formed by the adjacent surfaces of the components to be welded into a structure by utilizing the sensor means 37 and will automatically perform a welding operation.

The lines of welds to be made can be detected by performing calculations. First of all, the straight line QR can be determined from the line of intersection of the plane A and the plane D. The desired value can be obtained by calculation from the following equation involving the two planes:

$$\alpha_x + \beta_y + \gamma_z = \delta \quad (3)$$

The abovementioned equation involving the two planes can be obtained if the following equation can be solved, providing that three points $(x_1, y_1, z_1), (x_2, y_2, z_2)$ and $(x_3, y_3, z_3)$ are known):

$$\begin{vmatrix} x & y & z & 1 \\ x_1 & y_1 & z_1 & 1 \\ x_2 & y_2 & z_2 & 1 \\ x_3 & y_3 & z_3 & 1 \end{vmatrix} = 0 \quad (4)$$

Although this equation itself is simple, it will take a lot of time to perform calculations by using a microcomputer used for controlling the robot. A long operation time is required for determining the value of a straight line. To determine the straight line QR, it is also necessary to obtain the values for points Q and R. The values of the points Q and R can be obtained as the points of intersection of the planes B and C with the straight line QR. This requires an operation time which is no shorter than the time required for performing aforementioned operation time for obtaining the value of the straight line QR. Moreover, the same calculation must be performed with respect to straight lines PQ and RS to determine all the lines of welds to be made. It will thus be apparent that the system of detection lines of welds to be made by welding operation by performing calculations is not fit for practical use.

The system of directly detecting, by means of tactile sensors, lines of welds to be made may be proposed as an alternative method of detection. This method, however, will encounter the problem of complicating the control of the robot.

Figure 7:
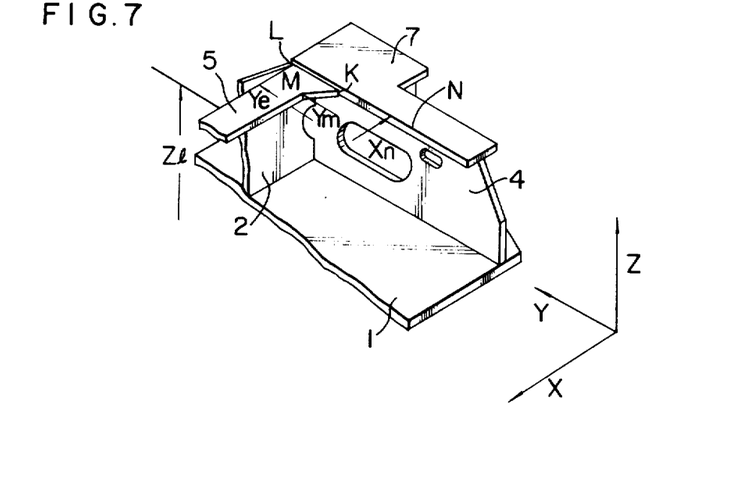
FIG.7 is a perspective view, on an enlarged scale, of a portion of the sturcture or work to be welded shown in FIG. 2.

The apparatus provided by this invention enables a line of weld to be made to be detected readily in performing welding in a structure shown in FIG. 7. The line of weld to be made LK shown in FIG. 7 is located in a narrow and complicated position, and this makes it difficult to detect such line directly by tactile sensors. Detection of such line of weld to be made can be detected according to the invention by reading the indicated coordinates $X_n$, $Y_m$, $Y_h$, and $Z_l$ of points L, M and N, so long as the degree of inclination of the line LK is known beforehand. Thus, it will be evident that, by controlling the posture of the work 10 and using a method of indirect detection of lines of welds to be made, the present invention makes it possible to greatly increase the scope of detection of lines of welds to be made, thereby enabling welding of components of a structure of a considerably complex construction to be performed automatically.

Figure 8:
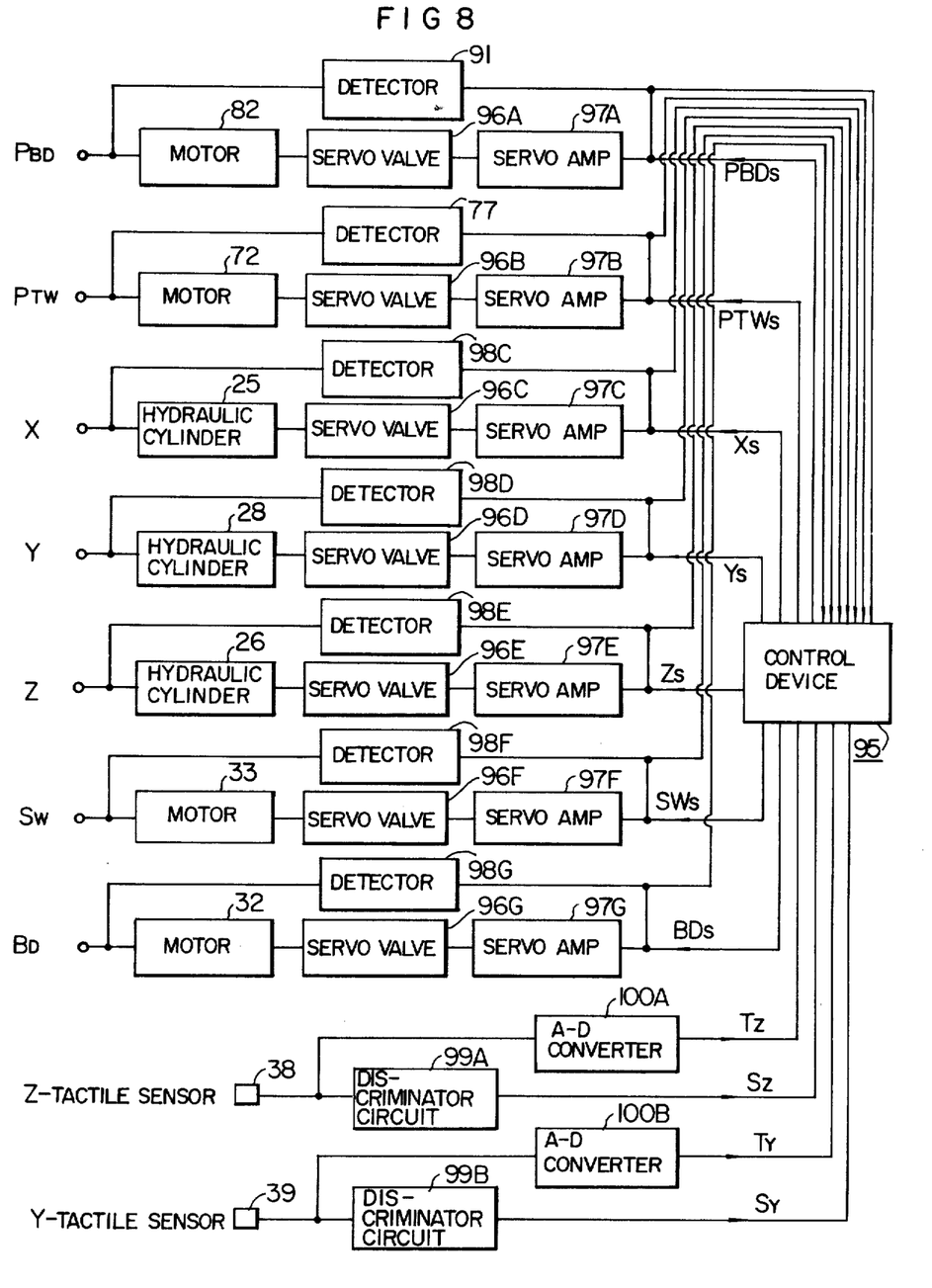
FIG. 8 is a block diagram showing, in systematic diagram, the control system for the automatic welding apparatus as a whole.

FIG. 8 shows a control system for automatic welding apparatus according to this invention. A control device 95 comprises a microcomputer as its main component. The micro-computer itself is known and does not form a part of this invention. The control device 95 issues, in accordance with a predetermined program, movement instructions X$s$, Y$s$, Z$s$, SW$s$ and BD$s$ to the axes X, Y, Z, SW and BD of the robot, and movement instructions PBD$s$ and PTW$s$ to the positioner 14. Differences between the values of these signals and the values of signals detected by detectors 98C, 98D, 98E, 98F and 98G, and 91 and 77 are obtained (feedback control), and the differences in signal are amplified by servo amplifiers 97C, 97D, 97E, 97F and 97G, and 97A and 97B. Servo valves 96C, 96D, 96E, 96F and 96G, and 96A and 96B are each actuated by one of the amplified values, so that a fluid is introduced into the hydraulic cylinders 25, 28 and 26, swing motors 33 and 32 and drive motors 82 and 72. Thus, the distances to be covered by the movements in the X-axis, Y-axis and Z-axis directions and the amounts of angular rotation about the SW-axis and BD-axis are given to the robot, and the amount of pivotal movement about the PDB-axis and the amount of angular rotation about the PTW-axis are given to the positioner 14.

Since the positions and angles of rotational or pivotal movement of the X-axis, Y-axis and Z-axis of the arm 12, the SW-axis and BD-axis of the wrist 13, and the PBD-axis and PTW-axis of the positioner 14 can be read directly by the control device 95, it is possible to obtain accurately the posture of the work 10 and the positions of lines of welds to be made and the position of the welding torch 36 relative thereto by combining signals from the Z tactile sensor 38 and Y tactile sensor 39 with the values of positions and angles of rotational or pivotal movement mentioned above.

Figure 9:
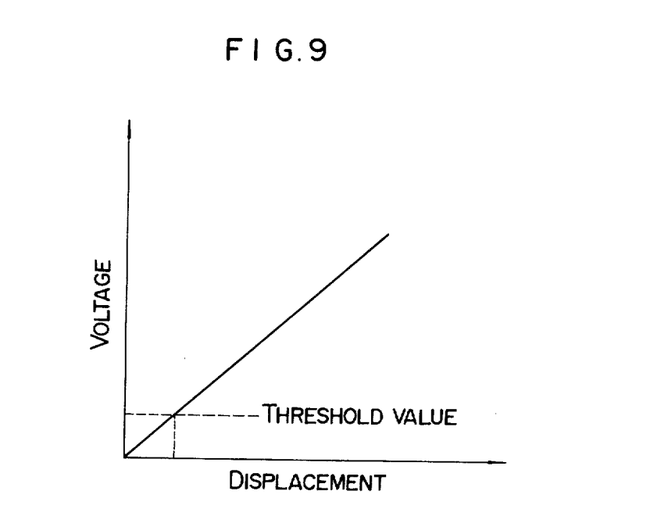
FIG. 9 is a graph showing the relation between the displacement of the tactile sensor means and the voltage produced by a potentiometer.

That is, displacements of the tactile sensors 38 and 39 are detected by potensiometers 49 and 50 respectively as voltage signals. As the voltage signals detected reach a threshold value which is set at a certain level as shown in FIG. 9 (the threshold value being a value indicating that the tactile sensors have positively detected an objective), signals S$_z$ and S$_y$ indicating that the objective has been detected are taken out by discriminator circuits 99a and 99B. The measures of these signals are taken out as signals T$_z$ and T$_y$ respectively by analog/digital converters 100A and 100B respectively and fed to the control device 95. The posture of the work 10 is detected from these signals and a deviation from a predetermined posture is calculated by the control device 95. Signals PBD$_s$ and PTW$_s$ are produced based on the calculated value to bring the positioner 14 to a predetermined position, thereby holding the work 10 in the predetermined posture. When the robot is disposed at the origin or when the coordinates of the robot X=O, Y=O, Z=O, BD=O and SW=O, the SW-axis is parallel to the Z-axis.

Figure 10:
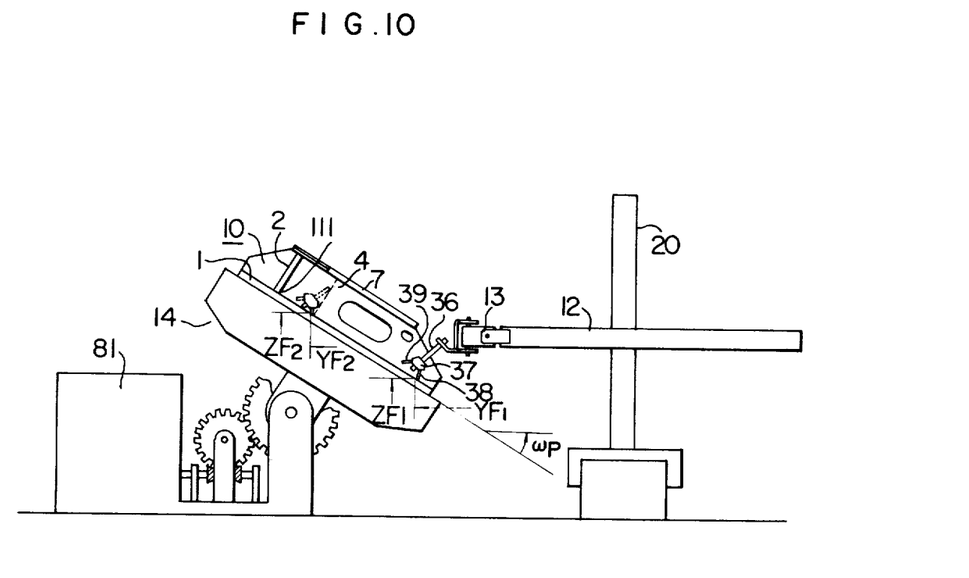
FIG. 10 is a view in explanation of the manner in which the angle of inclination $\omega p$ of the work relative to one plane of the robot is detected by the information provided by the tactile sensor means.

The operation of performing welding along the interface formed by the adjacent surfaces of two components of the work 10 which is temporarily assembled and placed on the positioner will be described with reference to FIG. 10 to FIG. 12. The description will be made with reference to a line of weld to be made 111 (the line AB in FIG. 11).

Firts of all, the line of weld to be made AB must be detected. Since the line of weld to be made AB is disposed in the plane 1, the positioner 14 must be moved to bring the plane 1 to a position in which it is parallel with the X-Y plane of the robot. The plane 1 being in intimate contact with the upper surface of the stool 65, one has only to measure the angle $\omega p$ and make the positioner 14 correct its posture accordingly. To this end, the angle $\omega p$ formed by the plane 1 and the plane X-Y must be measured by the robot. The wrist 13 of the robot is extended straight (SW=O and BD=O), and moved such that the Z tactile sensor 38 is brought into contact with the plane 1. There being a large opening in the plane 1, care should be taken to avoid engagement of the sensor in the opening. When the Z tactile sensor 38 is brought into contact with the surface 1, the T$_z$ signal is produced as aforementioned. A displacement S$z$ of the Z tactile sensor 38 produced at that time is read, and also the coordinates ($X_{F1}$, $Y_{F1}$, $Z_{F1}$) of the point of contact are read from the coordinates of the robot. These values are put to the memory.

Then, the robot is actuated such that the wrist 13 is moved forwardly in the Y-axis direction with the $X_{F1}$ remaining unaltered, so that the plane 1 can be detected by contacting the same in a suitable position. When the Z tactile sensor 38 is brought into contact with the plane 1 again, the coordinates ($X_{F2}$, $Y_{F2}$, $Z_{F2}$) of the point of contact wherein $X_{F1}=X_{F2}$ are read, and the value of $\omega p$ is obtained from the following equation by utilizing the values ($Y_{F1} - Y_{F2}$) and ($Z_{F1} - Z_{F2}$):

$$\omega p = \tan^{-1}(Z_{F1} - Z_{F2}/Y_{F1} - Y_{F2}) \tag{5}$$

If the positioner 14 is rotated through the angle represented by this value about the PBD-axis, then the plane 1 can be brought into agreement with the plane X-Y. In the case the line AB of the work 10 is inclined relative to the X-axis of the robot, then the position of the work 10 is corrected so as to make the line AB parallel with the X-axis. Thus, the line of weld to be made can be detected readily, thereby enabling a welding operation to be simplified.

Figure 11:
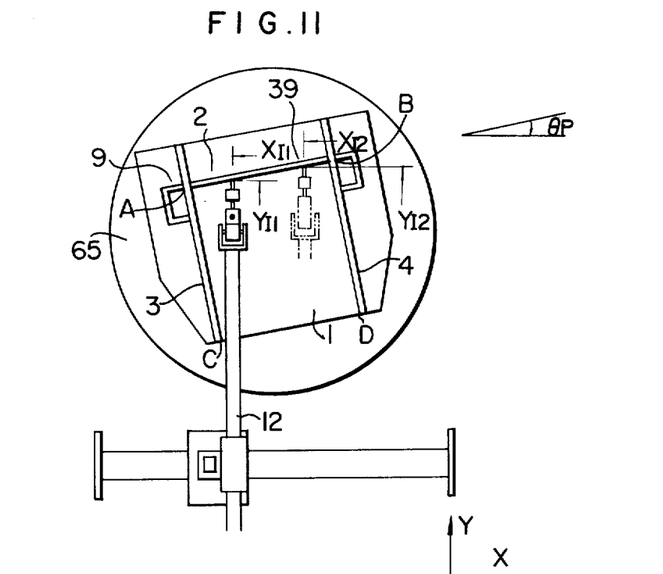
FIG. 11 is a view in explanation of the manner in which the angle of inclination $\theta p$ of the work relative to another plane of the robot is detected by the information provided by the tactile sensor means.

To this end, the wrist is moved straight forwardly in like manner till the Y tactile sensor 39 is brought into contact with the plane 2 as shown in FIG. 11, and the coordinates $(X_{I1}, Y_{I1}, Z_{I1})$ of the contact point are read. Then, the coordinates $(X_{I2}, Y_{I2}, Z_{I2})$ of another contact point wherein $Z_{I1} = Z_{I2}$ are read, with the height $Z_{I1}$ being kept unaltered. Thus, the value of $\theta p$ can be obtained from the following equation:

$$\theta p = \tan^{-1} \frac{Y_{I1} - Y_{I2}}{X_{I1} - X_{I2}} \tag{6}$$

This gives the angle through which the positioner 14 should be rotated about the PTW-axis. By giving a command signal for position correction based on this value, it is possible to make the line of weld to be made AB parallel with the X-axis of the robot.

Figure 12:
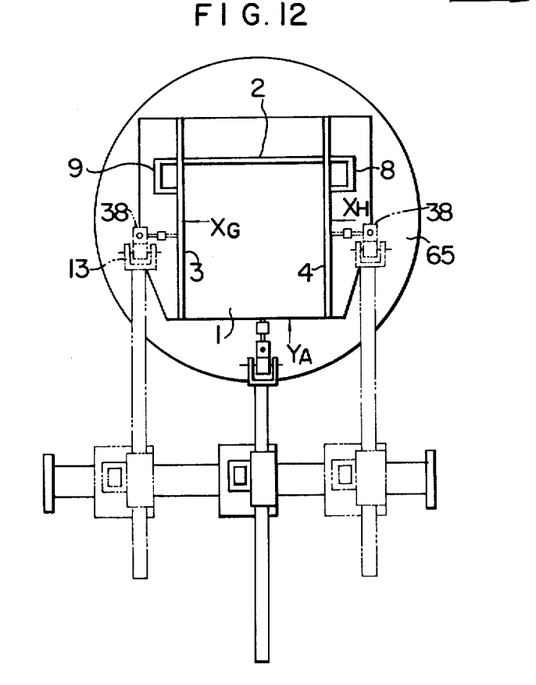
FIG. 12 is a view in explanation of the manner in which the positions of each component of the work is detected.

Then, the wrist 13 is rotated through 90 degrees as shown in FIG. 12 to bring the tactile sensor 38 into contact with the steel plate planes 3 and 4. If the positions $X_G$ and $X_H$ on the X-axis are read at the height $Z_F$ of the steel plate plane 1 by means of the tactile sensor 38, the position of the line of weld to be made AB will be unmistakably decided, since the thickness of steel plates 3 and 4 has been fed to the computer.

In case the planes 4, 3 and 2 are interconnected such that they are disposed at right angles to one another as shown in FIG. 12, lines of welds to be made AC, AB and BD (See FIG. 11) can be unmistakably detected if the front edge of the plane 1 or the position $Y_A$ on the Y-axis is obtained. Generally, many welded structures each consist of components which are planar and interconnected such that they are disposed at right angles to one another. Thus, if any plane which is used as a reference plane of the structure is combined with a coordinate plane or an axis of the robot, it is possible to determine the line of weld to be made by a simple operation of the robot. In case the steel plates are not interconnected such that they are disposed at right angles to one another, one has only to perform a positioning operation for each line of weld to be made, so that the lines of welds to be made can be detected by performing operations successively. This applies to the case where the line of weld to be made may be subjected to alterations as the welding operation progresses.

It is not impossible even for a micro-computer to perform calculation to determine a straight line in one plane from the coordinates of two points. Therefore, if it is troublesome to effect position correction for each weld line to be made by changing the posture of the work, it will be possible to detect each inclined line of weld to be made and perform welding in the inclined position so long as the welding operation can be programmed as thoroughly as is possible by using a software for a micro-computer.

The straight line or line of weld to be made AB can be determined by calculation from coordinates $(X_{I1}, Y_{I1}, Z_{I1})$ and $(X_{I2}, Y_{I2}, Z_{I2})$. The straight lines or lines of welds to be made AC and BD can be determined by the same process. The lines of welds to be made CABD can then be determined by obtaining the intersecting points of the lines CA and AB and AB and BD. By moving the welding torch 36 along these lines, it is possible to join the components or steel plates 1, 2, 3 and 4 by welding without taking the trouble to effect position correction.

In case the plane in which the lines of welds to be made CABD is located is parallel with a plane (X-Y plane in this case) formed by the system of coordinates of the arm 12 of the robot as shown in FIG. 11, it is advantageous to carry out welding by actuating the robot such as to cause the welding torch 36 to move along the lines of welds to be made. Thus, this process is generally adopted.

If the line of weld to be made is in agreement with a coordinate axis of the robot or if, for example, the line of weld to be made AB is in agreement with the X-axis of the robot after position correction is effected, one has only to actuate the robot such that the welding torch 36 is moved in the X-axis direction only. The result of this is that the weld produced is free from defects and high in quality. Also, in such case, the program can consists of several simple subprograms which makes for easy handling of the welding apparatus, thereby enabling a welding operation to be performed without requiring any skill.

From the foregoing description, it will be appreciated that in the automatic welding apparatus according to this invention, the robot itself performs detection of lines of welds to be made when components are welded to fabricate a structure of complex construction by welding. This offers the advantages of being able to eliminate the need to teach many items of information in detail to the robot and the need to maintain the dimensional accuracy of tack welds at a high level which has hitherto been impossible in robots of the prior art. Thus, the present invention enables full realization of advantages from use of a robot in the field of welding to be attained by thoroughly automating the welding apparatus and minimizing manual attention, because the need to perform preparatory operations which are time consuming and which require a lot of labor prior to performing a welding operation can be eliminated.

An additional advantage of the automatic welding apparatus provided by the invention is that the types of welds that can be produced by using a robot can be greatly increased, since a line of weld to be made which has hitherto been difficult to detect by means of a robot, such as the one found in the structure shown in FIG. 7, can be detected by measuring the positions of representative components located in the vicinity of such lines of weld to be made. Another additional advantage is that the robot can issue instructions to place itself in a position in which a line of weld can be readily detected and welding can be performed readily. This enables a simple program to be used for giving instructions to the robot by a control device. Thus, no highly developed skill is required for operating the automatic welding apparatus according to the invention, so that it can have applications in producing welds which have hitherto been unable to produce by using a robot.

I claim:

1. An automatic welding apparatus comprising a robot and a welding torch having a tip, wherein said robot comprises:
   a main body serving as a drive means;
   an arm supported by said main body and driven thereby to move in three-dimensional directions;
   a wrist connected to a forward end of said arm and pivotable around at least two pivotal axes extending perpendicular to each other, said welding torch being supported by said wrist;
   two tactile sensors mounted on said wrist for tactually sensing positions of components to be welded into a unitary structure and having respective axes extending perpendicular to one another, one of said tactile sensors extending perpendicular to one of said at least two pivotal axes of said wrist; and means for calculating the positions of points at which welding is to be performed based on the amount of displacement of each said tactile sensor and producing control signals whereby the tip of said welding torch can be positioned in each said point in response to each of said control signals.

2. An automatic welding apparatus as claimed in claim 1, wherein said wrist comprises a swing motor and a swing motor support member.

3. An automatic welding apparatus as claimed in claim 1, wherein said wrist comprises two swing motors connected to one another such that their longitudinal axes are disposed normal to one another, and said tactile sensors are mounted on one of said two swing motors which is remote from said forward end of said arm.

4. An automatic welding apparatus as claimed in claim 1, wherein said wrist has a flange attached thereto for removably supporting said welding torch, said welding torch includes a tubular body and a welding core wire extending through said tubular body along the longitudinal axis thereof, and said tactile sensors are slidably mounted on said welding torch, each of said tactile sensors including a bore, a displacement detector mounted within said bore, and a tactile rod connected at a rear end thereof to said displacement detector and extending outwardly from said bore at a forward end thereof.

5. An automatic welding apparatus comprising:
an arm supported for movement in X-axis, Y-axis and Z-axis directions forming rectangular coordinates;
a wrist connected to a forward end of said arm and pivotable around at least two pivotal axes extending perpendicular to each other;
a welding torch supported by said wrist;
a plurality of tactile sensors for measuring displacements of components to be welded in a direction parallel to one of said at least two pivotal axes of said wrist and in a direction perpendicular to said one of said at least two pivotal axes of said wrist and producing measurement signals;
control means receiving said measurement signals from said tactile sensors and calculating a proper posture of each of the component to be welded for producing positioning signals; and
positioner means receiving said positioning signals from said control means for positioning each of said components to be welded in said proper posture.

6. An automatic welding apparatus as claimed in claim 5, wherein said tactile sensors are slidably mounted on said wrist for movement between forward and rearward positions with respect to said welding torch.

7. An automatic welding apparatus as claimed in claim 5, wherein said tactile sensors are slidably mounted on said wrist for movement between forward and rearward positions with respect to said welding torch, said tactile sensors being capable of measuring the posture of the components to be welded at least along two axial directions.

8. An automatic welding apparatus as claimed in claim 5, wherein said positioner means comprises a stool which is rotatable about a longitudinal axis thereof and pivotal about an axis which is normal to said longitudinal axis, said apparatus further comprising means for detecting the degrees of pivotal movement and angular rotation of said stool.

* * * * *